Feb. 24, 1959  H. H. HAAS  2,874,804
ENGINE OIL PAN AND DRY SUMP LUBRICATION SYSTEM
Filed Sept. 24, 1956  3 Sheets-Sheet 1

INVENTOR.
HERBERT H. HAAS
BY
ATTORNEYS

Feb. 24, 1959 H. H. HAAS 2,874,804
ENGINE OIL PAN AND DRY SUMP LUBRICATION SYSTEM
Filed Sept. 24, 1956 3 Sheets-Sheet 2
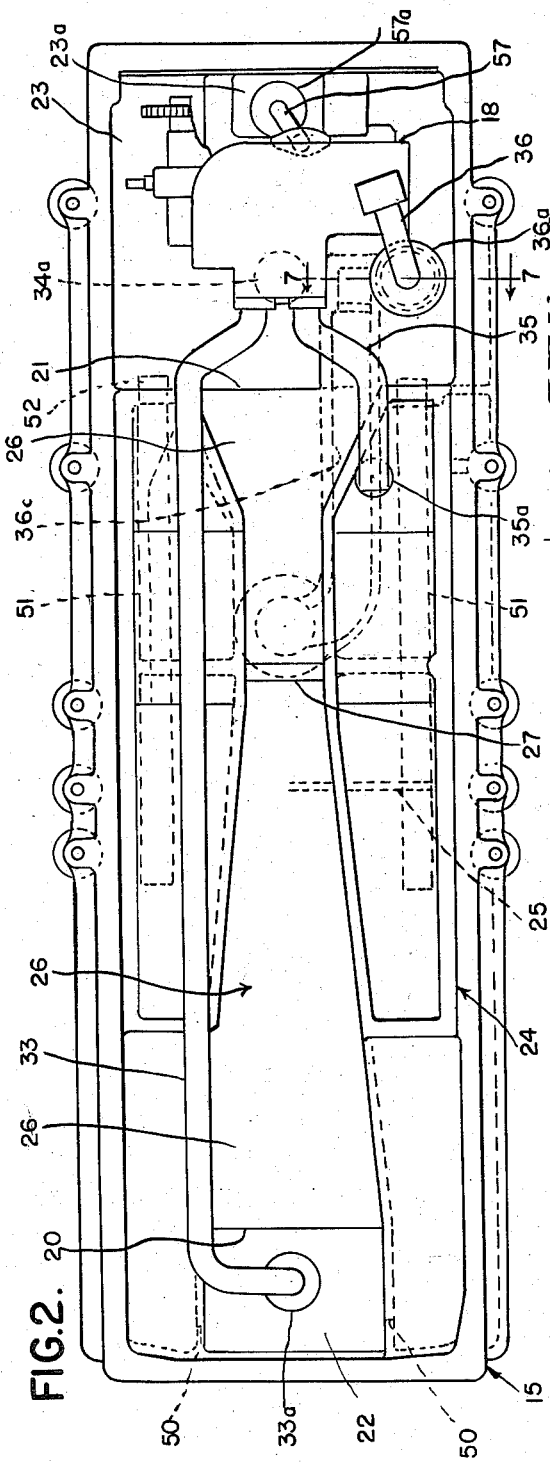
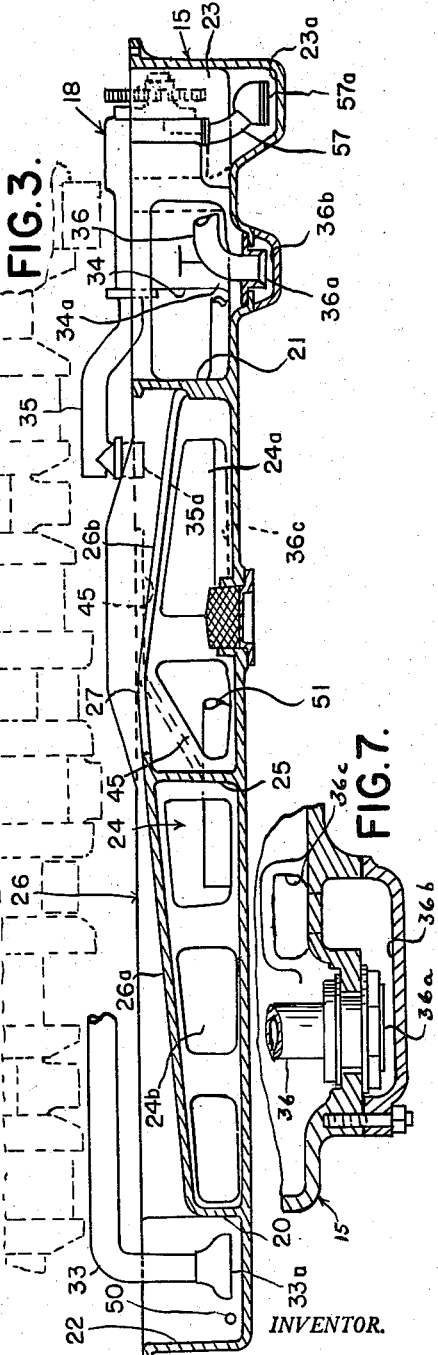
INVENTOR.
HERBERT H. HAAS
BY
ATTORNEYS

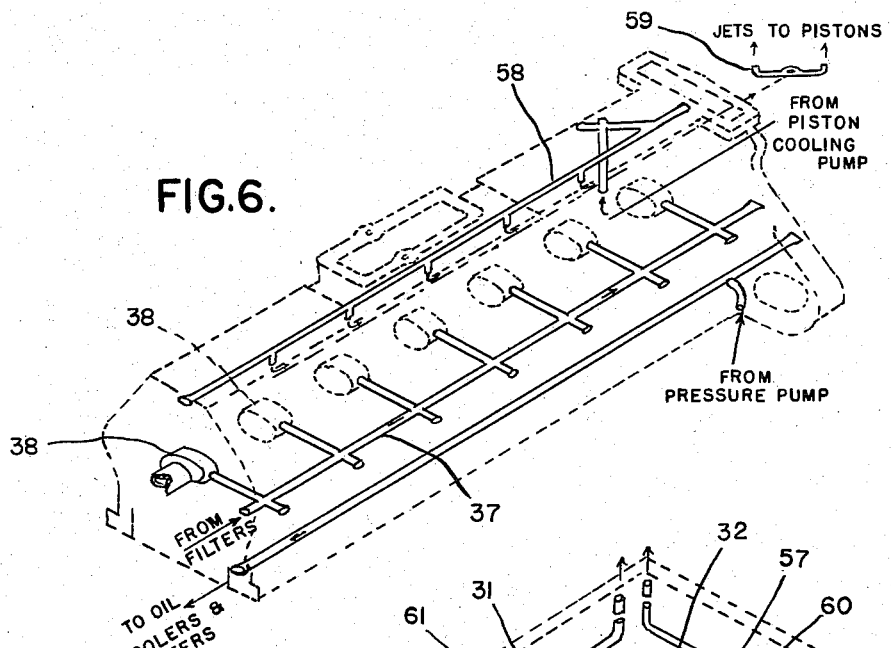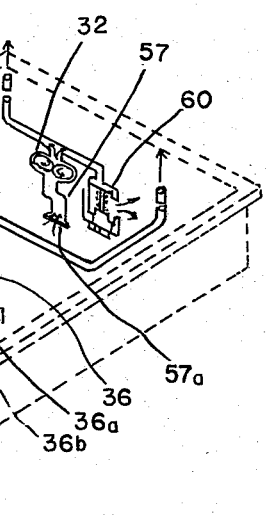

United States Patent Office 2,874,804
Patented Feb. 24, 1959

2,874,804

ENGINE OIL PAN AND DRY SUMP LUBRICATION SYSTEM

Herbert H. Haas, Royal Oak, Mich., assignor, by mesne assignments, to Continental Motors Corporation, Muskegon, Mich., a corporation of Virginia Application September 24, 1956, Serial No. 611,444

14 Claims. (Cl. 184—6)

This invention relates to lubrication systems for internal combustion engines and more particularly to a dry sump lubrication system built into the engine oil pan.

Generally, dry sump lubricating systems utilize an exterior oil tank from which oil is drawn for use in the engine and an oil collecting sump beneath the crankcase from which drip oil is pumped back to the oil tank. Naturally, such a system necessitates a great quantity of piping, as well as increasing the package size of the engine. Large high performance engines cannot make use of the conventional, simpler, and more compact oil pan for dip lubrication for many reasons. However, my present invention proposes to utilize a specially constructed oil pan as a dry sump system.

In particular, an object of this invention is to provide an improved dry sump lubrication system by utilizing a specially constructed oil pan comprising both sumps and oil reservoirs and adapted to prevent crankshaft dipping even during tilted engine operation.

A further object of this invention is to provide an effective dry sump system in an engine oil pan by constructing the pan whereby a maximum head of oil is maintained for pressure pump use even with a minimum of oil supply and under all practical conditions and positions of engine operation.

Another object of this invention is to provide for high capacity delivery of engine oil for both lubrication and piston cooling purposes by constructing an oil pan dry sump oil supply system which keeps the flow of oil in the pressure lubricating system independent from the flow in the cooling system.

Further objects and advantages of the invention will become clear in the following description and by reference to the accompanying drawings illustrating a preferred embodiment of the invention in which like characters refer to like parts throughout the several views and in which Fig. 1 is a partially cut-away rear elevational view of a preferred engine embodying this invention.

Fig. 2 is a top view of the engine oil pan as seen substantially from the line 2—2 of Fig. 1.

Fig. 3 is a side elevational view of the oil pan partially in cross section.

Fig. 5 is a perspective diagrammatic view of the oil pan showing the structural relationships and oil flow.

Fig. 6 is a perspective diagrammatic view of the engine crankcase indicating oil flow and distribution, and Fig. 7 is a sectional detail taken substantially on the line 7—7 of Fig. 2.

Figure 1:
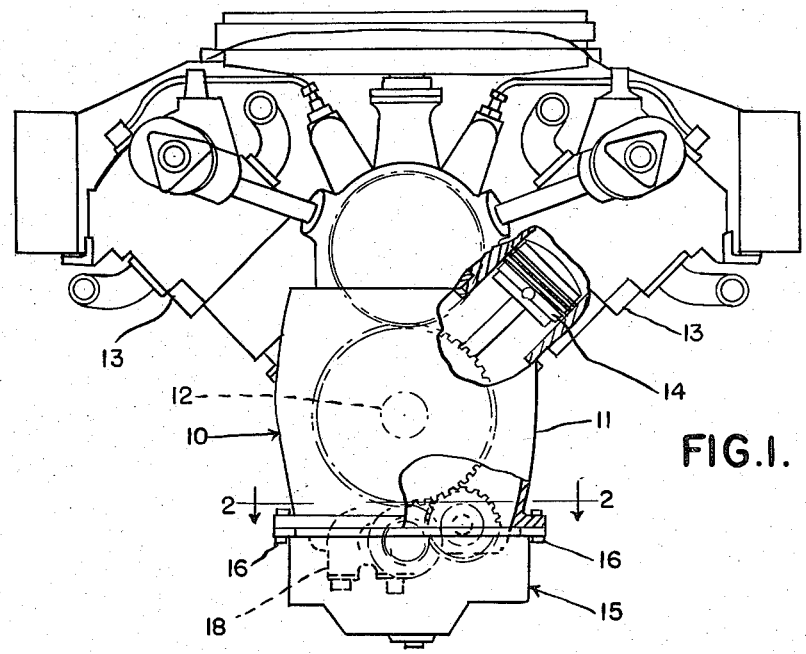

Fig. 1 illustrates a preferred internal combustion engine 10 having a crankcase 11, a crankshaft 12, cylinders 13 and pistons 14 operable in the cylinders 13 and connected to the crankshaft 12. An oil pan structure 15 is secured by any means such as bolts 16 to the lower side of the crankcase 11. Fig. 1 shows the flywheel or rear end of the engine, as it is preferably situated in a vehicle (not shown). A multiple oil pump assembly 18 is preferably mounted by any suitable means near the rear end of the engine 10.

In Figs. 2 and 3, the oil pan structure 15 is illustrated as having two substantially laterally disposed main wall members 20 and 21, separating the oil pan into three primary portions; namely, a well-like forward sump portion 22, and a rear sump portion 23, and an intermediate tank-like reservoir portion 24. The reservoir portion 24 is further separated into a pressure pump oil compartment 24a and a reserve oil compartment 24b by a wall section 25. It will be seen that the sump portions 22 and 23 are open to the crankcase, whereas the reservoir portion 24 is isolated from the crankcase by a cover structure 26 having forward and rearward sloped sections 26a and 26b respectively, meeting at a laterally extending peak 27 which is disposed substantially medially of the ends of the oil pan structure 15. Thus, drip oil from the crankcase above will normally drain substantially equally toward each sump, but will not flow into the reservoir portion 24.

Figure 4:
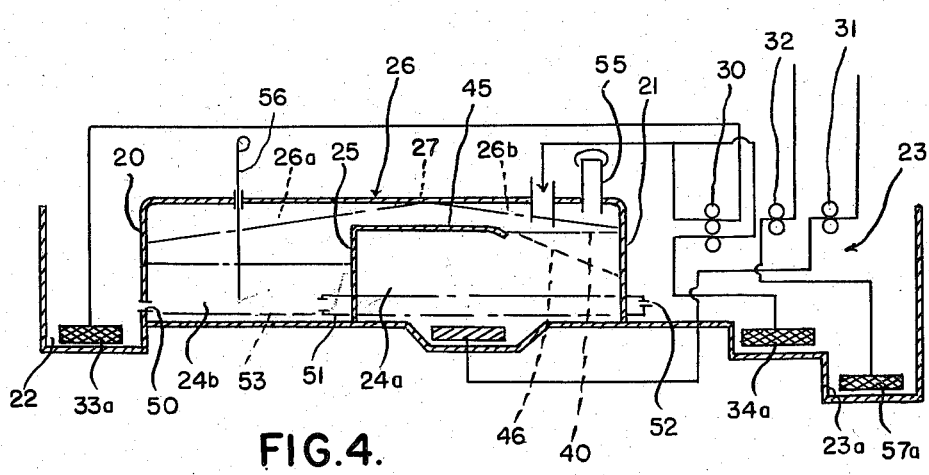
Fig. 4 is a diagrammatic longitudinal sectional view of the oil pan and indicating oil flow.

The multiple oil pump assembly 18 comprises three pumping components, as indicated in Figs. 4 and 5; namely, a scavenge pump 30, a pressure lubrication pump 31, and a piston cooling pump 32. Scavenge pump intake pipes 33 and 34 have their respective intakes 33a and 34a disposed in the forward and rear sump portions 22 and 23 respectively, and a scavenge oil discharge pipe 35 has its outlet 35a disposed in the oil pan reservoir portion 24, being adapted to discharge oil directly into the pressure pump oil compartment 24a. Thus, the pressure pump oil compartment 24a will be constantly replenished with oil.

The pressure lubrication pump 31 is provided with an intake pipe 36 having its intake 36a connected with a well 36b which receives oil through a passage 36c connected to the lowermost portion of the pressure pump oil compartment 24a, and is suitably connected by means of pipes and drilled passages with oil coolers and filters (not shown) and thence with a lubricating oil delivery gallery 37 connected to crankshaft bearings 38 as indicated in Fig. 6.

The pressure pump 31 is constructed to have a lower delivery rate than the scavenge pump 30, so that the oil is normally replaced in the pressure pump oil compartment 24a faster than it is withdrawn, tending to maintain the oil level therein at the maximum indicated by the dotted line 40 in Fig. 4, and insuring a maximum pressure head at the pressure pump intake. In addition, since oil will not accumulate in the open sump portions 22 and 23, the crankshaft will not dip into the oil, even if the engine is tilted.

The pressure pump oil compartment 24a is provided with a shroud member 45 connected to the wall section 25 and overlying the major part of the pump oil compartment 24a. The shroud member 45 is spaced from the lower surface of the cover structure 26 to provide a passage for the overflow of oil from the pump oil compartment 24a into the reserve oil compartment 24b. The shroud member 45 serves both to retain a substantially maximum oil level, indicated by the dotted line 46 of Fig. 4, in the pump oil compartment during downhill tilted engine operation, and to defoam the overflow oil passing over the shroud member 45.

The oil in the reserve oil compartment 24b is put into limited circulation by providing drain holes 50 in the corners of the forward end and pipes 51 extending from the reserve compartment through the pump compartment 24a and having a drain hole 52 in the rear end. Thus, when the front end of the engine 10 is tilted upward, oil will drain into the rear sump portion 23; when the rear end of the engine 10 is tilted upward, oil will drain into the front sump portion 22; and when the engine 10 is level, or tilted sideways, oil will flow substantially equally into both sump portions 22 and 23. The amount of drainage of oil from the reserve oil compartment 24b is determined by the size of the holes 50 and 52. In any position or condition of the engine 10, oil will be supplied to the sump portions 22 and/or 23, where it is picked up by the scavenge pump 30 and returned to the pump oil compartment 24a, thus insuring the aforesaid maximum oil level therein, irrespective of the oil level in the reserve oil compartment 24b, which could drop to a minimum indicated by the dotted line 53 in Fig. 4 without affecting the head at the pressure pump intake.

An oil filler pipe 55 is provided to permit the addition of oil directly into the pump oil compartment 24a, so that even when the engine is not operating, a maximum level may be attained. However, the oil level in the pump oil compartment 24a is no indication of the total oil level of the system, so a conventional dipstick type of oil level indicator 56 is provided in the reserve oil compartment 24b.

In high performance engines, oil cooling of the pistons is generally required. Usually, a part of the flow in the conventional lubricating oil system is used, but in large air-cooled engines, the oil flow required for cooling purposes is so great that pipes, filter systems, and by-pass valves must be of excessive or exaggerated dimensions. The problem is solved in the present engine by providing the separate piston cooling pump 32, which picks up oil from a depressed portion 23a, through an intake pipe 57 having an intake 57a and distributes it by means of suitable pipes and drilled passages directly to a piston cooling gallery 58 and thence through jets 59 which spray the oil on the pistons.

Because of the high rate of oil delivery by both the pressure lubrication pump 31 and the piston cooling pump 32, it is inadvisable to have the suction pickups at the same spot in the oil pan. Therefore, the pressure pump pickup is independent of the piston cooling pump pickup, and since adequate lubrication is more critical than piston cooling, the pressure pump supply is given first consideration by the construction of the oil pan. However, to ensure normal oil flow to the piston cooling pump 32, its intake 57a is from the depressed portion 23a in the rear sump portion 23 which is at a lower point than the scavenge pump intake 34a. Also, the cooling pump intake 57a is preferably positioned in the rear sump portion 23 rather than the forward sump portion 22 so that uphill operation of the vehicle, when the engine 10 is under its greatest load, will tend to provide a full supply of oil to the piston cooling pump 32; during downhill operation, when the engine 10 is under little load, the drainage of oil away from the rear sump portion 23 is immaterial, since piston cooling is then unnecessary.

A thermostatic bypass valve 60 is provided for the piston cooling pump 32, as indicated in Fig. 5. When the engine is relatively cool, the valve 60 will be open, and the oil will flow out of the piston cooling pump 32 back into the rear sump portion 23. When the engine temperature increases due to a higher load, the valve 60 will close and cooling oil delivery to the pistons will begin. A conventional pressure relief valve 61 is also preferably included on the pressure side of the pressure pump 31, and will discharge oil at a predetermined relief pressure into the rear sump portion 23.

Although I have described and illustrated but one preferred embodiment of my invention, it will be apparent to one skilled in the art to which the invention pertains that various changes and modifications may be made therein without departing from the spirit of the invention or the scope of the appended claims.

I claim:

1. In an internal combustion engine having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion, at least one of said sump portions being disposed at a lower level than said reservoir portion, means openly connecting said reservoir and said lower level sump portion and operable to drain oil by gravity from said reservoir into said lower level sump portion, and a scavenge pump means having an intake associated with said sump portions and adapted to pump oil from said sump portions into said reservoir portion.

2. In an internal combustion engine having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion, said reservoir portion comprising a pressure pump oil compartment and a reserve oil compartment, means interconnecting said compartments to permit overflow of oil from said pump oil compartment when filled with oil into the reserve oil compartment, and means draining oil from said reserve oil compartment into said sump portions.

3. In an internal combustion engine having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion, said reservoir portion comprising a pressure pump oil compartment and a reserve oil compartment, means interconnecting said compartments to permit overflow of oil from said pump oil compartment when filled with oil into the reserve oil compartment, and means draining oil from said reserve oil compartment into said sump portions, said pressure pump means intake connected to said pump oil compartment for pumping oil from same to said engine for lubricating purposes and scavenge pump means having an intake associated with said sump portions and adapted to pump oil from said sump portions into said pump oil compartment.

4. In an internal combustion engine having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion, said reservoir portion comprising a pressure pump oil compartment and a reserve oil compartment, means interconnecting said compartments to permit overflow of oil from said pump oil compartment when filled with oil into the reserve oil compartment, and means draining oil from said reserve oil compartment into said sump portions, said pressure pump means intake connected to said pump oil compartment for pumping oil from same to said engine for lubricating purposes and scavenge pump means having an intake associated with said sump portions and adapted to pump oil from said sump portions into said pump oil compartment, said scavenge pump means constructed to have a greater delivery rate relative to said pressure pump delivery rate to maintain a maximum oil level in said pump oil compartment irrespective of the oil level in said reserve oil compartment.

5. In an internal combustion engine having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion, said reservoir portion comprising a pressure pump oil compartment and a reserve oil compartment, means interconnecting said compartments to permit overflow of oil from said pump oil compartment when filled with oil into the reserve oil compartment, and means draining oil from said reserve oil compartment into said sump portions, said pressure pump means intake connected to said pump oil compartment for pumping oil from same to said engine for lubricating purposes and scavenge pump means having an intake associated with said sump portions and adapted to pump oil from said sump portions into said pump oil compartment, said scavenge pump means constructed to have a greater delivery rate relative to said pressure pump delivery rate to maintain a maximum oil level in said pump oil compartment irrespective of the oil level in said reserve oil compartment, oil filling means arranged for adding oil directly into said pump oil compartment, and means indicating the oil level in said reserve oil compartment.

6. In an internal combustion engine having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion, and a scavenge pump means having an intake associated with said sump portions and adapted to pump oil from said sump portions into said reservoir portion, said sump portions disposed one at each end of said oil pan and said reservoir portion comprising a walled tank like structure disposed intermediate said sump portions and having a cover member inclined upwardly from each end of said tank structure to a laterally extended peak, said peak disposed substantially medially from the ends of said oil pan whereby drip oil from said crankcase will flow approximately equally into each of said sumps.

7. In an internal combustion engine having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion and a scavenge pump means having an intake associated with said sump portions and adapted to pump oil from said sump portions into said reservoir portion, said sump portions disposed one at each end of said oil pan and said reservoir portion comprising a walled tank-like structure disposed intermediate said sump portions and having an inner wall section dividing said reservoir portion into a pressure pump oil compartment and a reserve oil compartment, a cover member overlying the reservoir portion to substantially isolate the interior of same from the crankcase, the upper edge of said wall section spaced from the lower surface of said cover member, and a shroud member extending from the wall section upper edge and overlying a part of said pump oil compartment to substantially retain most of the oil in said pump compartment when the engine is tilted.

8. In an internal combustion engine having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion and a scavenge pump means having an intake associated with said sump portions and adapted to pump oil from said sump portions into said reservoir portion, said sump portions disposed one at each end of said oil pan and said reservoir portion comprising a walled tank-like structure disposed intermediate said sump portions and having an inner wall section dividing said reservoir portion into a pressure pump oil compartment and a reserve oil compartment, a cover member overlying the reservoir portion to substantially isolate the interior of same from the crankcase, the upper edge of said wall section spaced from the lower surface of said cover member, and a shroud member extending from the wall section upper edge and overlying a part of said pump oil compartment to substantially retain most of the oil in said pump compartment when the engine is tilted, and means draining oil from each end of said reserve oil compartment respectively into each of said sump portions.

9. In an internal combustion engine having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion and a scavenge pump means having an intake associated with said sump portions and adapted to pump oil from said sump portions into said reservoir portion, said sump portions disposed one at each end of said oil pan and said reservoir portion comprising a walled tank-like structure disposed intermediate said sump portions and having an inner wall section dividing said reservoir portion into a pressure pump oil compartment and a reserve oil compartment, a cover member overlying the reservoir portion to substantially isolate the interior of same from the crankcase, the upper edge of said wall section spaced from the lower surface of said cover member, and a shroud member extending from the wall section upper edge and overlying a part of said pump oil compartment to substantially retain most of the oil in said pump compartment when the engine is tilted, and means draining oil from each end of said reserve oil compartment respectively into each of said sump portions, said pressure pump means having an intake associated with said pump oil compartment and adapted for pumping oil from same to said engine for lubricating purposes, and scavenge pump means having an intake associated with said sump portions and adapted for pumping oil from said sump portions into said pump oil compartment.

10. In an internal combustion engine having a crankcase, an oil pan secured beneath said crankcase and pressure pump means having an intake associated with said oil pan and adapted to pump oil under pressure from said oil pan to said engine for lubrication purposes, said oil pan having a bottom wall and side walls, substantially upwardly extending laterally disposed wall members enclosed interiorly of said oil pan and constructed to define a sump portion at each end of said pan and a reservoir portion intermediate said sump portions, a cover member overlying said reservoir portion to substantially isolate the interior thereof from the crankcase, said pressure pump intake associated with said reservoir portion, and scavenge pump means having an intake associated with said sump portions and adapted to pump oil from same into said reservoir portion.

11. In an internal combustion engine having a crankcase, an oil pan secured beneath said crankcase and pressure pump means having an intake associated with said oil pan and adapted to pump oil under pressure from said oil pan to said engine for lubrication purposes, said oil pan having substantially laterally disposed wall members defining a sump portion at each end of said pan and a reservoir portion intermediate said sump portions, a cover member overlying said reservoir portion to substantially isolate the interior thereof from the crankcase, a wall section disposed in said reservoir portion and separating same into a pump oil compartment and a reserve oil compartment, said wall section having an upper edge spaced from the lower surface of said cover member to permit overflow of oil from said pump oil compartment when filled with oil into said reserve oil compartment, means draining oil from said reserve oil compartment into said sump portions, said pressure pump intake associated with said pump oil compartment, and scavenge pump means having an intake associated with said sump portions and adapted to pump oil from same into said pump oil compartment.

12. In an internal combustion engine having a crankcase, an oil pan secured beneath said crankcase and pressure pump means having an intake associated with said oil pan and adapted to pump oil under pressure from said oil pan to said engine for lubrication purposes, said oil pan having substantially laterally disposed wall members defining a sump portion at each end of said pan and a reservoir portion intermediate said sump portions, a cover member overlying said reservoir portion to substantially isolate the interior thereof from the crankcase, a wall section disposed in said reservoir portion and separating same into a pump oil compartment and a reserve oil compartment, said reservoir provided with means admitting to said reserve oil compartment only that oil which overflows from said pump oil compartment.

13. In an internal combustion engine for a vehicle and having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion, at least one of said sump portions being disposed at a lower level than said reservoir portion, and a scavenge pump means having an intake associated with said sump portions and adapted to pump oil from said sump portions into said reservoir portion, said oil pan having a cooling oil sump portion disposed at a lower level than the other sump portions, and a second pressure pump means having an intake associated with said cooling oil sump portion and adapted to pump oil from same to said engine for cooling purposes.

14. In an internal combustion engine for a vehicle and having a crankcase, an oil pan secured beneath said crankcase and pressure pump means having an intake connected with said oil pan and adapted to pump oil under pressure from said oil pan to said engine for lubrication purposes, said oil pan comprising sump portions open to said crankcase and a substantially enclosed oil reservoir portion, at least one of said sump portions being disposed at a lower level than said reservoir portion, and a scavenge pump means having an intake associated with said sump portions and adapted to pump oil from said sump portions into said reservoir portion, said oil pan having a cooling oil sump portion disposed at lower level than the other sump portions, and a second pressure pump means having an intake associated with said cooling oil sump portion and adapted to pump oil from same to said engine for cooling purposes, said cooling oil sump portion disposed at the rear end of said oil pan to ensure a supply of cooling oil in said cooling oil sump when said vehicle is moving forwardly up an incline and increasing the load on said engine.

References Cited in the file of this patent

UNITED STATES PATENTS

| | | |
|---|---|---|
| 1,502,264 | Moore | July 22, 1924 |
| 1,876,708 | MacPherson | Sept. 13, 1932 |
| 1,948,929 | MacPherson | Feb. 27, 1934 |
| 2,051,026 | Booth | Aug. 18, 1936 |

FOREIGN PATENTS

| | | |
|---|---|---|
| 503,360 | France | Mar. 16, 1920 |
| 228,409 | Great Britain | Feb. 5, 1925 |